US006687429B2

(12) United States Patent
Chung

(10) Patent No.: US 6,687,429 B2
(45) Date of Patent: Feb. 3, 2004

(54) OPTICAL SWITCH WITH LIQUID-AIR-LIQUID SWITCH ASSEMBLY

(75) Inventor: Yueh Liang Chung, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 193 days.

(21) Appl. No.: 09/880,328

(22) Filed: Jun. 12, 2001

(65) Prior Publication Data

US 2002/0085799 A1 Jul. 4, 2002

(30) Foreign Application Priority Data

Dec. 28, 2000 (TW) ........................ 89222645 U

(51) Int. Cl.[7] ................ G02B 6/26; G02B 6/42
(52) U.S. Cl. ................ 385/19; 385/16; 385/18; 385/44; 385/47
(58) Field of Search .................. 385/22, 19, 16, 385/44, 47, 18

(56) References Cited

U.S. PATENT DOCUMENTS

| 4,589,730 A | * | 5/1986 | Obu ......................... 359/228 |
| 6,195,478 B1 | * | 2/2001 | Fouquet ........................ 385/17 |
| 6,408,112 B1 | * | 6/2002 | Bartels ......................... 385/16 |

FOREIGN PATENT DOCUMENTS

JP  04-361216  * 12/1992

* cited by examiner

Primary Examiner—Drew Dunn
Assistant Examiner—Joshua L Pritchett
(74) Attorney, Agent, or Firm—Wei Te Chung

(57) ABSTRACT

An optical switch (100) includes a shell (40) forming an input port (10) and first and second output ports (50, 60) with an optical switching subassembly enclosed therein between the input port and the output ports. The optical switch subassembly includes two light transmitting blocks (21, 22) having surfaces spaced from and opposing each other. Two light transmitting liquid sections having a refractive index substantially identical to that of the blocks are movably retained between the surfaces. The liquid sections are spaced from each other forming an air section therebetween. A piezoelectric element (31) is in physical engagement with the liquid sections. The piezoelectric element can be electrically biased to move the air section and the liquid sections between a first position wherein the air section is located on an optical path from the input port to the second output port, light from the input port being fully reflected by the surfaces of the blocks and being redirected to the first output port and a second position where one of the liquid sections is located on the optical path, allowing light to completely travel along the optical path and thus switching the light from the input port to different output ports.

16 Claims, 5 Drawing Sheets

OPTICAL SWITCH WITH LIQUID-AIR-LIQUID SWITCH ASSEMBLY

BACKGROUND OF THE INVENTION

1. Field of the Invention

The present invention relates to an optical switch, and particularly to an optical switch employing a piezoelectric element to perform optical switching function.

2. Description of Related Art

With the increasing development of optical telecommunications, the development of optical switches has become vital for better performance. A typical optical switch has one or more light input port(s) and at least two light output ports. Using these ports, the switch performs switching or logical operations on optical signals in a light transmitting link/system or in an integrated optical circuit. Measures for assessing the capability of an optical switch include low insertion bss (IL, <1 db), good isolation performance (>50 db), and fast switching speed (normally, tens of milliseconds).

Optical switches are commonly catergorized into mechanical type and non-mechanical type. In principle, a mechanical type optical switch has a number of advantages over a non-mechanical type optical switch when switching speed is not a critical factor for performance consideration. The mechanical type optical switches offer low insertion losses, high degree of immunity against backscattering of light from the switch back down the input fiber, low crosstalk, and insensitivity to wavelength of light.

Some conventional mechanical switches operate by moving an input fiber relative to a plurality of output fibers. Examples of such designs are disclosed in U.S. Pat. Nos. 4,303,302, 4,896,935 and 5,175,776. However, these optical switches share a common problem. They require high precision parts to obtain precise positioning control and low insertion loss. This results in high cost and complicated manufacturing process. Moreover, moving fibers repeatedly to and fro is apt to damage or even break the fibers.

Other kinds of conventional mechanical optical switches perform their optical switching functions by moving optical elements of the switches, such as ferrules with attached input/output fibers, reflectors, and lenses. U.S. Pat. No. 4,261,638 discloses an optical switch as shown in FIG. 5 of the attached drawings, comprising a rotatable reflector 3. The switching function is performed by rotating the reflector 3. The reflector 3 can be rotated around different axes, such as axis 2–2', to switch the transmission of light coming from an input fiber 1 between selected output fibers 6. The switching speed of this optical switch is determined by the rotating speed of the reflector 3 and corresponding controlling mechanisms of the reflector 3. Since the optical switch is operated by rotating the reflector 3 around different rotating axes, the design and manufacturing of the optical switch are complicated. resulting in high cost.

BRIEF SUMMARY OF THE INVENTION

A main object of the present invention is to provide an optical switch with high switching speed and low insertion loss.

An optical switch in accordance with an embodiment of the present invention comprises an input port and first and second output ports. An optical switching subassembly is arranged between the input port and the output ports. The input port and the first and second output ports are arranged in a T-shaped configuration with the input port and the second output port substantially aligned with each other forming an optical path. The first output port is arranged perpendicular to the optical path. The optical switch further comprises a shell enclosing the input and output ports and the optical switching subassembly.

The optical switching subassembly includes a first optical transmitting medium and a second optical transmitting medium respectively having first and second surfaces spaced from and opposing each other. A switching means is movably retained between the first and second surfaces of the transmitting media. The switching means comprises two optical transmitting liquid sections between the surfaces and an air section between the liquid sections. A piezoelectric (PZT) element is in physical engagement with one of the liquid sections and can be electrically biased to move the switching means between first and second positions.

The first and second optical transmitting media have the same first refractive index $N_1$. The first and second transmitting liquid sections have the same refractive index $N_2$ which is approximately equal to $N_1$.

When the switching means is at the first position, the air section is coincident with the optical path between the input port and the second output port. Thus, light from the input port will be fully reflected by the first surface of the first optical transmitting medium and re-directed to the first output port. When the switching means is at the second position, the air section is moved out of the optical path and one of the liquid sections is moved to the optical path between the input port and the second output port. Since the second refractive index $N_2$ is approximately equal to the first refractive index $N_1$, light from the input port is transmitted directly through the first transmitting medium, the liquid section and the second transmitting medium, and exits the optical switch via the second output port.

DETAILED DESCRIPTION OF THE INVENTION

Figure 1:
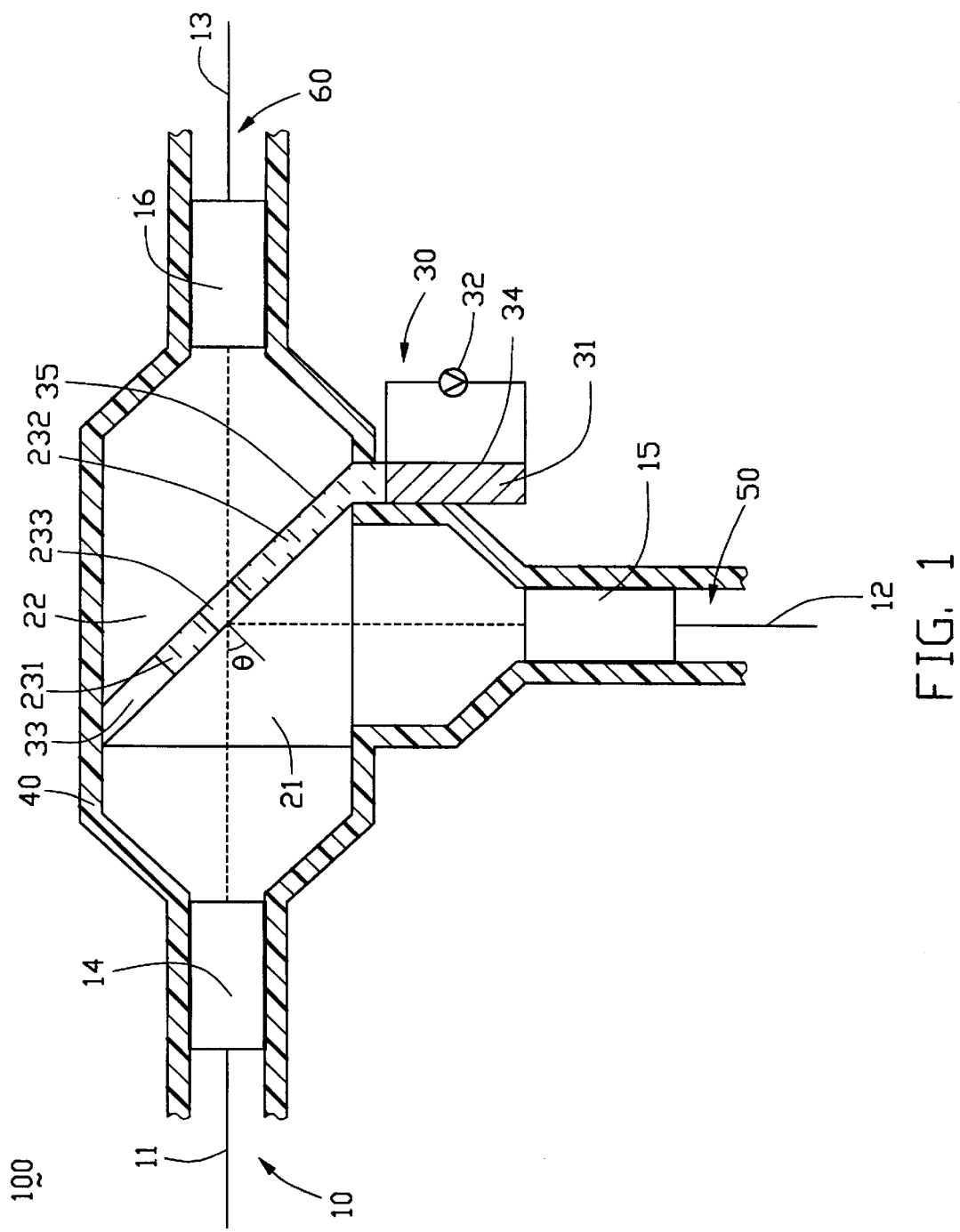
FIG. 1 is a cross-sectional schematic view of an optical switch in accordance with the present invention.

Referring to FIG. 1, an optical switch 100 in accordance with the present invention comprises a shell 40 enclosing an optical switching subassembly (not labeled). The shell 40 has an input port 10 and first and second output ports 50, 60 arranged in a T-shaped configuration wherein the input port 10 and the second output port 60 are substantially aligned with each other along an optical path. The switching subassembly is arranged at a center (an intersection) of the T-shape between the input port 10 and the output ports 50, 60. The first output port 50 is arranged perpendicular to the optical path between the input port 10 and the second output port 60. The input port 10, and the first and second output ports 50, 60 each comprise an input/output fiber 11 (12, 13) and a collimating lens 14 (15, 16).

The optical switching subassembly includes a first optical transmitting medium 21 having a triangular cross section and a first surface, a second optical transmitting medium 22 having a second surface spaced from and opposing the first surface, and a switching means 30 sandwiched between the first and second surfaces of the transmitting mediums 21, 22. The switching means 30 comprises an enclosure 33 having a first portion 34 outside the shell 40 and a second portion 35 arranged in the space between the first and second transmitting media 21, 22 and in communication with the first portion 34. The switching means 30 comprises first and second transmitting liquid sections 231, 232 which are properly enclosed so that the optical characteristics of the liquid are not affected. The liquid sections 231, 232 are movably retained in the second portion 35 of the enclosure 33 between the first and second transmitting media 21, 22. The liquid sections 231, 232 are spaced from each other to define an air section 233 therebetween. A piezoelectric (PZT) element 31 is contained in the first portion 34 of the enclosure 33 and is in physical engagement with the second liquid section 232 therein. The PZT element 31 is electrically connected to a power source 32 whereby the PZT element 31 can be selectively biased by the power source 32 and thus changes between a non-biased, first condition and a biased, second condition. The change of the PZT element 31 between the first and second conditions moves the liquid sections 231, 232 and the air section 233 between first and second positions with respect to the transmitting media 21, 22.

The first and second transmitting mediums 21, 22 have the same refractive index $N_1$. The first and second transmitting liquid sections 231, 232 also share the same refractive index $N_2$. $N_2$ is approximately equal to $N_1$ and preferably satisfies the following inequality relationship: $N_1 \sin 45 > N_2$. It is more preferable if the inequalities: $N_2 > N_1$ and $|(N_1-N_2)/N_1| > 0.05$ are also satisfied. The air section 233 has a refractive index $N_3$ which meets the requirements: $N_3 < N_1$, $N_3 < N_2$, and $\theta > \arcsin(N_3/N_1)$, where $\theta$ is the incident angle of light from the first transmitting medium 21 to the air section 233. The second portion 35 of the enclosure 33 has a refractive index approximately equal to $N_1$ of the first and second transmitting mediums 21, 22, thereby having little or even no influence on the performance of the optical switch.

Figure 2:
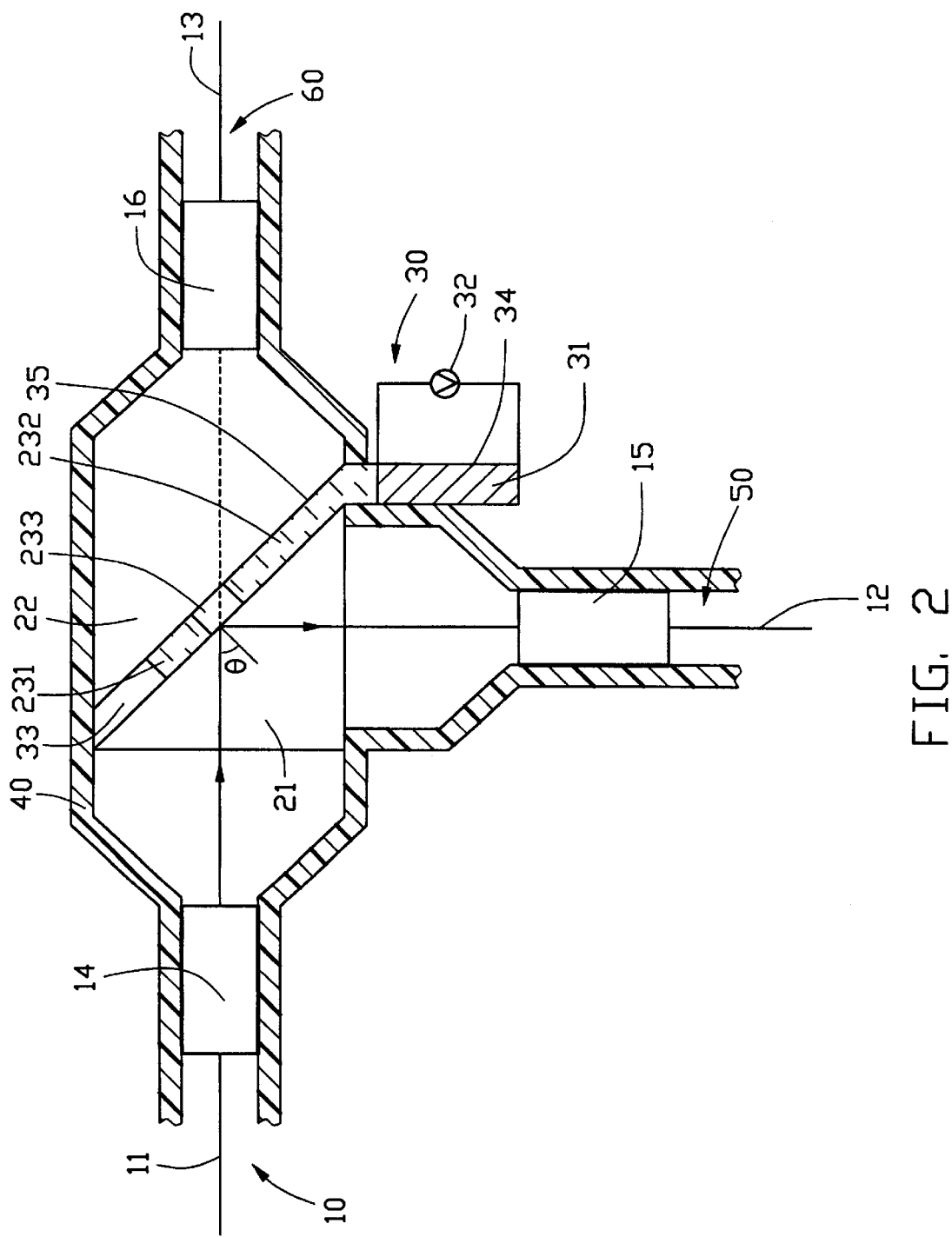
FIG. 2 is a cross-sectional schematic view of the optical switch of FIG. 1 showing a light signal transmitted from an input port to a first output port.

Referring to FIG. 2, in the first condition where the PZT element 31 is not biased, the air section 233 is in the first position that is coincident with the optical path from the input port 10 to the second output port 60. Light passing through the first transmitting medium 21 from the input port 10 is fully reflected by the first surface of the first transmitting medium 21 and is redirected to the first output port 50.

Figure 3:
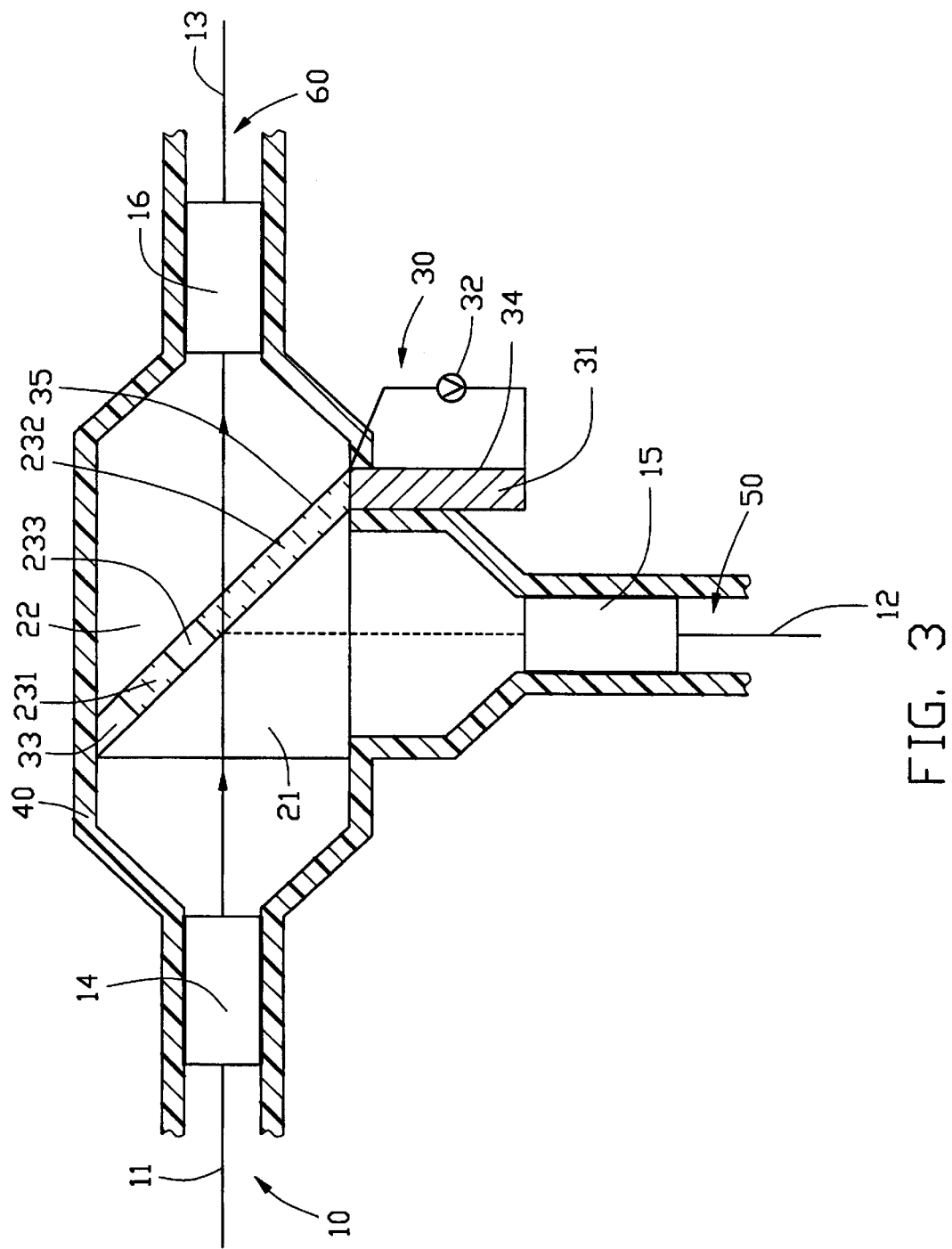
FIG. 3 is a cross-sectional schematic view similar to FIG. 2 but showing a light signal transmitted from the input port to a second output port.

Referring to FIG. 3, in the second condition where the PZT element 31 is biased, the second transmitting liquid section 232 and the air section 233 are moved to the second position where the second transmitting section 232 is located on the optical path while the air section 233 is not. In other words, the second transmitting liquid section 232 replaces the air section 233 in the optical path from the input port 10 toward the second output port 60. Under this condition, light from the input port 10 is transmitted directly through the first transmitting medium 21, the second transmitting liquid section 232 and the second transmitting medium 22, and exits the optical switch via the second output port 60.

The PZT element 31 can also be designed to change in a reversed direction when it is biased. In this situation, the air section 233 is replaced by the first transmitting liquid section 231 in the optical path from the input port 10 to the second output port 60. Since the first transmitting liquid section 231 also has the refractive index $N_2$, the same effect as described above with the respect to the second transmitting liquid section 232 can be achieved.

In the embodiment illustrated in FIGS. 1, 2 and 3, the PZT element 31 is generally located outside the shell 40 of the optical switch. However, the PZT element 31 can also be designed to be completely received within the shell 40. Furthermore, the switching means can also be embodied in other arrangements and still accord with the present invention.

Figure 4:
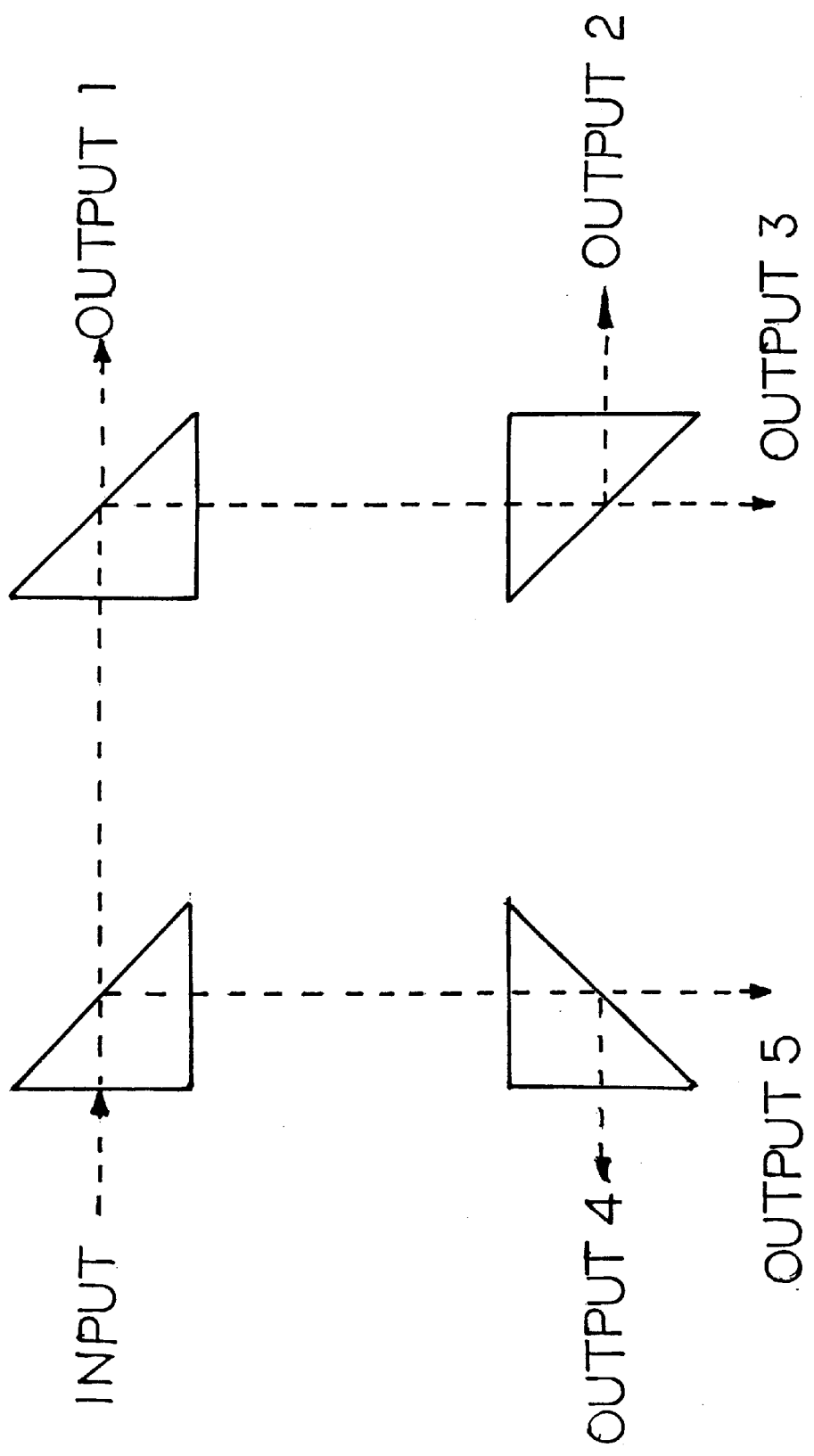
FIG. 4 is a diagram showing an optical switch assembly/system containing more than one optical switch and defining more than two output ports/paths thereof.
Figure 5:
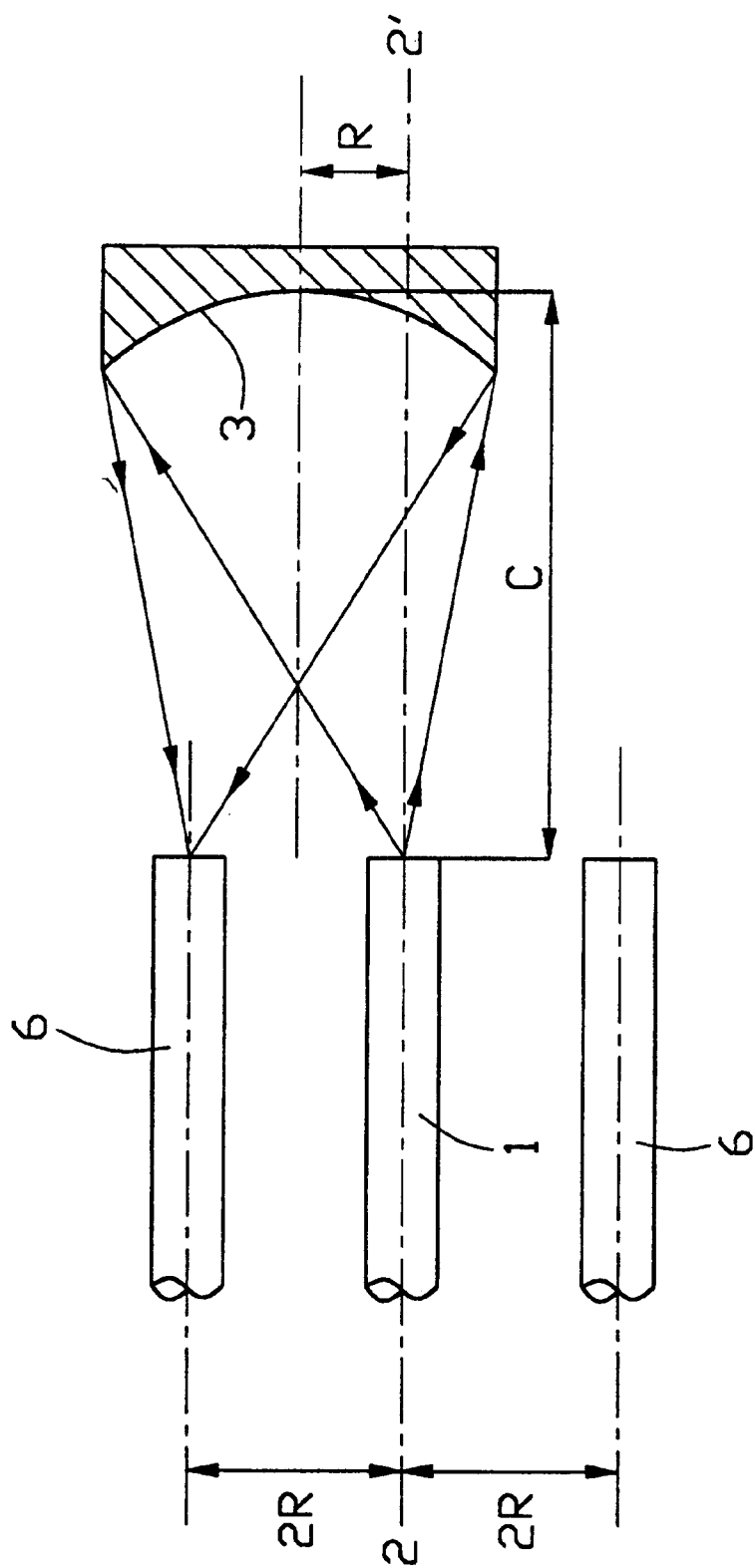
FIG. 5 is a schematic view of a conventional optical switch.

FIG. 4 shows an optical switch assembly/system having a plurality of optical switches and defining more than two output ports.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical switch comprising:

an input port and first and second output ports, the ports being arranged in a T-shaped configuration with the second output port substantially aligned with the input port along an optical path, the first output port being arranged in a direction substantially perpendicular to the optical path;

an optical switching subassembly arranged between the input port and the output ports comprising a first optical transmitting medium adjacent the input port and a second optical transmitting medium adjacent the second output port, the first optical transmitting medium having a first surface and the second optical transmitting medium having a second surface opposing the first surface, a switching means sandwiched between the first and second surfaces of the optical transmitting mediums; and the switching means comprising first and second optical transmitting liquid sections movably retained between the first and second surfaces, the first and second optical transmitting liquid sections being spaced from each other to form an air section therebetween, wherein the switching means has a first condition where the air section and the optical transmitting liquid sections are in a first position and a second condition where the air section and the optical transmitting liquid sections are in a second position;

wherein, in the first position, the air section is on the optical path whereby an input light from the input port is fully reflected by the first surface of the first optical transmitting medium and is redirected to the first output port and wherein, in the second position, one of the optical transmitting liquid sections is located on the optical path whereby an input light from the input port is allowed to travel along the optical path toward the second output port.

2. The optical switch as claimed in claim 1 further comprising a shell enclosing the input port, the first and second output ports, and the optical switching subassembly therein, and additionally comprising a piezoelectric element in physical engagement with one of the optical transmitting liquid sections, the piezoelectric element being adapted to be biased by an external power source for changing the switching means between the first and second conditions.

3. An optical switch comprising:

an input port;

first and second output ports;

first and second optical transmitting mediums having a first refractive index $N_1$, being disposed between the input port and the second output port and; and an optical switching means sandwiched between the first and second optical transmitting mediums;

wherein the optical switching means comprises first and second optical transmitting liquid sections and an air section movably retained in the optical switching means, the first and second optical transmitting liquid sections being spaced from each other with the air section therebetween, wherein the air section has a third refractive index $N_3$, the first optical transmitting medium has a first surface, an input light from the input port forming an incident angle $\theta$ with respect to the first surface, the incident angle being such that $\theta > \arcsin(N_3/N_1)$, wherein the optical switching means has a first position and a second position, wherein, in the first position, the air section is on the optical path whereby an input light from the input port is redirected to the first output port, and in the second position, one of the optical transmitting liquid sections is located on the optical path whereby an input light from the input port is allowed to travel along the optical path toward the second output port.

4. The optical switch as claimed in claim 3, wherein the first output port is perpendicular to a linear light path between the input port and the second output port.

5. The optical switch as claimed in claim 3, wherein the third refractive index $N_3$ of the air section is smaller than the first refractive index $N_1$ of the first and second optical transmitting mediums, $N_3 < N_1$.

6. The optical switch as claimed in claim 5, wherein the first and second transmitting liquid sections have a second refractive index $N_2$ approximately equal to the first refractive index $N_1$ of the first and second optical transmitting mediums.

7. The optical switch as claimed in claim 6, wherein the second and first refractive indexes $N_2$ and $N_1$ satisfy the conditions: $N_2 < N_1$ and $|(N_1 - N_2)/N_1| < 0.05$.

8. An optical switch comprising:

an input port;

first and second output ports; and an optical switching means sandwiched between the input port and the output ports;

wherein the optical switching means comprises first and second optical transmitting liquid sections and an air section movably retained in the optical switching means, the first and second optical transmitting liquid sections being spaced from each other with the air section therebetween, and the switching means further comprises a piezoelectric element coupled to one of the transmitting liquid sections, wherein the optical switching means has a first position and a second position, wherein, in the first position, the air section is on the optical path whereby an input light from the input port is redirected to the first output port, and in the second position, one of the optical transmitting liquid sections is located on the optical path whereby an input light from the input port is allowed to travel along the optical path toward the second output port.

9. The optical switch as claimed in claim 8, wherein the piezoelectric element is adapted to be biased electrically to change a dimension thereof for moving the switching means to the second position where one of the optical transmitting liquid sections is located on the optical path between the input port and the second output port.

10. The optical switch as claimed in claim 8 further comprises a shell enclosing the input port, the first and second output ports, the first and second optical transmitting mediums, and the optical switching means therein.

11. An optical switch assembly comprising at least one switch, each of said switches defining an input port and first and second output ports, a first path being defined between said input port and the first output port and resulting from at least one reflection, a second path being defined between the input port and said second output port and resulting from a straight penetration, and an optical switching device positioned around an intersection area of said first path and said second path to determine which path light coming from the input port will leave the switch, wherein the optical switching device comprises a first and a second optical transmitting liquid section movably retained therein, and the first and second optical transmitting liquid sections are spaced from each other to form an air section therebetween; wherein each of said switches has a T-shaped configuration with the second output port is substantially aligned with the input port along an optical path, and the first output port is arranged in a direction substantially perpendicular to the optical path.

12. The assembly as claimed in claim 11, wherein an optical transmission medium is disposed behind and around the input port while before the switching device, and wherein the light from the input port passes said optical transmission medium regardless of whether it leaves the switch through the first path or the second path.

13. The assembly as claimed in claim 12, wherein another optical transmission medium is disposed around and in front of the second output port, and wherein the second path penetrates said another transmission medium while the first path not.

14. The assembly as claimed in claim 12, wherein said switch device includes a moveable transmission liquid section having a similar refractive index with the transmission medium.

15. The assembly as claimed in claim 11, wherein said switch device is moveable along a line angular to said second path for not only blocking the second path but also reflecting the light toward the first path.

16. The assembly as claimed in claim 11, wherein more than one optical switches are linked with one another, and wherein more than two output ports are formed and the light leaving from output ports of some of said switches enter the input ports of others, respectively.

* * * * *